March 18, 1947.　　　　C. L. HILL　　　　2,417,597
CULTIVATOR FENDER
Filed July 25, 1944

Inventor
Charles L. Hill,
Attorney

Patented Mar. 18, 1947

2,417,597

UNITED STATES PATENT OFFICE 2,417,597

CULTIVATOR FENDER

Charles L. Hill, Sioux Falls, S. Dak.

Application July 25, 1944, Serial No. 546,502

1 Claim. (Cl. 97—188)

This invention relates to attachments for cultivators or plows and pertains more particularly to a device for protecting growing plants such as corn or the like, during the cultivation thereof.

The primary important object of this invention is to provide a device of the above character for attachment to a cultivating implement which may be quickly and easily adjusted so as to protect plants of varying types during the cultivation thereof.

Another important object of this invention is to provide a device of the above character which is so supported from the cultivator that the same will readily pass over clods of earth or other obstacles which may be encountered during the movement thereof over the ground being cultivated.

Another important object of this invention is to provide a device of the above character which includes a bracket so formed that the same may be readily attached to and detached from the cultivator or other earth turning implement supporting standard and which may be readily and quickly adjusted either vertically or horizontally so as to accommodate the same to the row of plants being cultivated.

Still another important object of the invention is to provide a device of the above character which may be readily and accurately adjusted with respect to the type of plant being cultivated and to adjust the same with respect to the cultivating implement being used.

A still further object of this invention is to provide a device of the above character which requires a minimum of material, is efficient in operation, and one which may be cheaply manufactured and placed upon the market at reasonable cost.

The foregoing and other objects and advantages of this invention will be readily apparent throughout the course of the following description and drawings, in which Figure 1 is a side elevation of the invention attached to a cultivator shovel supporting standard, the latter being shown in dotted lines;

Figure 1:
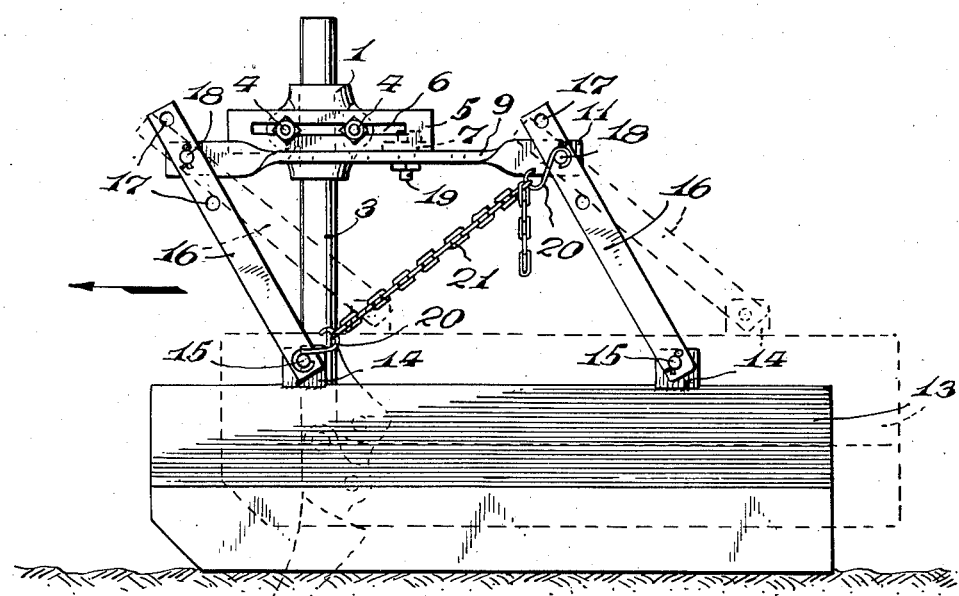
Figure 2:
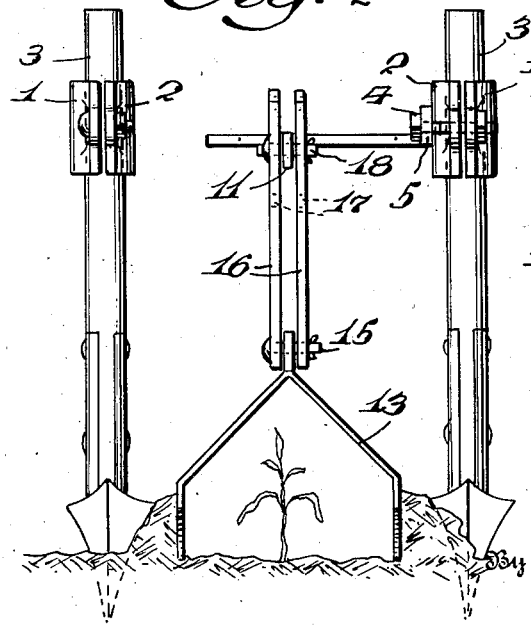
Figure 2 is a front elevation of the same.
Figure 3:
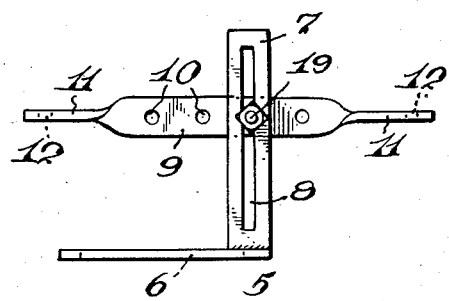
Figure 3 is a top plan view of a portion of the supporting bracket forming an essential part of the invention.

Referring in detail to the drawings, a clamp composed of a pair of plates 1 and 2 is adjustably engaged with a cultivator supporting standard 3 by means of a pair of bolts 4 or other suitable fastening means. A vertically disposed plate 5 having a horizontally positioned elongate slot 6 therein is adjustably secured to the standard-engaging clamp composed of plates 1 and 2 by means of the bolts 4. An arm 7 is integrally secured to the plate 5 adjacent one end of the latter, and extends outwardly therefrom at substantially right angles thereto. The arm 7 is formed with an elongate vertically extending slot 8.

Secured to the supporting arm 7 for slidable adjustment therealong is a bar 9 having a series of spaced vertically directed bolt receiving openings 10 therein. The bar 9 has each of its end portions 11 twisted so that said ends will lie in a plane substantially at right angles to the main body portion of the bar 9. Each of the end portions 11 of the bar 9 is provided with the bolt-receiving opening 12.

A shield 13 of substantially conical shape in cross section or in end elevation is provided with a pair of spaced vertically extending ears 14 each having openings therethrough for the reception of a bolt or pin 15. Pivotally connected to each of the ears 14 by means of the bolts 15 is a pair of spaced links 16 formed at their upper free ends with a plurality of spaced alined openings 17. The upper ends of the arms 16 are pivotally connected to the respective ends 11 of the bar 9 by means of bolts 18.

Thus far, the invention consists of the clamps 1 and 2 secured to the standard 3 by means of the bolts 4. The bolts 4 also are utilized for clamping the plate 5 in horizontal position upon the standard 3. The bar 9 is connected through slot 8 and the desired opening 10 in any desired position of adjustment by means of a nut and bolt connection 19.

The hood 13 is swingably supported from the outer ends 11 of the bar 9 through the medium of the links 16 and by means of the bolts 18 disposed through the opening 12 and desired opening 17 of the links 16, depending upon the height the hood is to be suspended above the ground.

As aforementioned the links 16 are pivotally secured to the ears 14 of the hood 13 by means of bolts 15. Provision for further adjustment of the hood above the ground in spaced relation to the latter and independently of the links 16 and bolts 18 is provided for by means of hooks 20, 20, connected respectively to one each of the bolts 15 and 18.

A chain or other suitable flexible means 21 is then adjustably connected to the hooks 20 so as to hold the hood in either the full or dotted line position shown in Figure 1 or in varying positions therebetween.

In operation it will be readily apparent that downward movement of the hood is limited by the effective length of the chain 21 while upward movement of the hood is substantially unrestricted so that same will pass over clods of earth or any other obstacles which may be encountered during the cultivating operation.

The shape of the hood 13 facilitates the fending off of any earth which may be thrown toward the plants being cultivated, with the result that the latter during and after cultivation thereof are left uninjured.

It is to be understood that the form of my invention, herewith shown and described, is to be taken as a preferred example of the same, and that various changes in the shape, size and arrangement of parts may be resorted to, without departing from the spirit of my invention, or the scope of the subjoined claim.

Having thus described my invention, I claim:

In a device of the character described, an earthworking implement supporting standard, a clamp vertically adjustable on said standard, means for connecting the clamps to said standard, an adjustable horizontally disposed bar having a slot therein for receiving said clamp connecting means, whereby said bar is connected to said clamp and for permitting forward and rearward adjustments of said bar parallel to the normal path of movement of said earthworking implement independently of said clamp, a slotted arm rigidly connected to and extending outwardly at right angles from said bar, a second bar connected intermediate its ends to said arm for horizontal adjustments along said slotted bar parallel to and transversely of the normal path of movement of said earthworking implement, a plant protecting hood pivotally connected to and supported by said second-named bar, and means connecting the second named bar and hood for holding the latter in various horizontal and vertical adjusted positions with respect to the ground and to a row of plants to be cultivated.

CHARLES L. HILL.

REFERENCES CITED

The following references are of record in the file of this patent:

UNITED STATES PATENTS

| Number | Name | Date |
| --- | --- | --- |
| 392,824 | Pontius | Nov. 13, 1888 |
| 248,129 | Bates | Oct. 11, 1881 |
| 86,521 | Fox | Feb. 2, 1869 |
| 663,494 | Harris | Dec. 11, 1900 |
| 720,173 | McManmon | Feb. 10, 1903 |
| 1,789,780 | Schultze | Jan. 20, 1931 |
| 302,144 | Jones | July 15, 1884 |